US005558760A

United States Patent [19]
Sekhar

[11] Patent Number: 5,558,760
[45] Date of Patent: Sep. 24, 1996

[54] FILTER/HEATING BODY PRODUCED BY A METHOD OF SPRAYING A SHAPE

[75] Inventor: Jainagesh A. Sekhar, Cincinnati, Ohio

[73] Assignee: Micropyretics Heaters International, Inc., Cincinatti, Ohio

[21] Appl. No.: 369,426

[22] Filed: Jan. 6, 1995

Related U.S. Application Data

[63] Continuation-in-part of Ser. No. 353,727, Dec. 12, 1994.
[51] Int. Cl.$^6$ .......................... B01D 35/14; B01D 39/20; C04B 35/622
[52] U.S. Cl. ...................... 210/106; 55/523; 55/DIG. 30; 210/184; 210/510.1; 264/42; 264/43; 264/45.1; 427/245
[58] Field of Search ..................... 55/428, 523, DIG. 30, 55/309; 210/97, 106, 184, 185, 186, 490, 510.1, 130; 264/42, 43, 44, 45.1, 56; 427/227, 245, 247, 314, 315, 318–320; 501/80

[56] References Cited

U.S. PATENT DOCUMENTS

| | | | |
|---|---|---|---|
| 3,565,830 | 2/1971 | Keith et al. | |
| 3,608,610 | 9/1971 | Greatorex et al. | 210/185 |
| 4,400,352 | 8/1983 | Rehnberg et al. | 422/4 |
| 4,610,832 | 9/1986 | Brockmeyer | 210/510.1 |
| 4,868,841 | 9/1989 | Affleck et al. | |
| 4,975,191 | 12/1990 | Brockmeyer et al. | 210/510.1 |
| 5,001,899 | 3/1991 | Santiago et al. | 60/274 |
| 5,015,381 | 5/1991 | Elion et al. | 210/490 |
| 5,073,625 | 12/1991 | Derbyshire | 210/184 |
| 5,094,075 | 3/1992 | Berendes | 55/DIG. 30 |
| 5,221,484 | 6/1993 | Goldsmith et al. | 210/510.1 |
| 5,234,663 | 8/1993 | Harada et al. | 55/523 |
| 5,248,425 | 9/1993 | Wu | 210/510.1 |
| 5,279,737 | 1/1994 | Sekhar et al. | 210/490 |
| 5,281,462 | 1/1994 | Day et al. | 210/510.1 |
| 5,334,570 | 8/1994 | Beauseigneur et al. | 502/334 |
| 5,342,591 | 8/1994 | Pfefferie | 423/230 |
| 5,376,610 | 12/1994 | Takahata et al. | 502/66 |
| 5,436,216 | 7/1995 | Toyao et al. | 55/DIG. 30 |
| 5,446,264 | 8/1995 | Kondo et al. | 55/DIG. 30 |

OTHER PUBLICATIONS

Mechanical Engineering, *Reducing tailpipe emissions with catalytic converters*, Ashley, vol. 116/No. 11, Nov. 1994, pp. 81–82.

Developments in Diesel Particulate Control Systems, *Open-Pore Ceramic Foam as Diesel particulate Filter*, Mizrah, Maurer, Gauckler and Gabathuler, (Switzerland) pp. 19–27.

Applied Catalysis B: Environmental, 3, *Preparation, activity and durability of promoted platinum catalysts for automotive exhaust control*, Gonzalez–Velasco, Entrena, Gonzalez–Marcos, J. I. Gutierrez–Ortiz, and M. A. Gutierrez–Ortiz, 1994 Elsevier Science B.V., pp. 191–204.

Catalysis Today, 10, *Purification of Diesel Exhaust Gas*, Saito and Ichihara, 1991 Elsevier Science Publishers B. V., pp. 45–56.

Evaluation of a Stacked Element Diesel particulate Trap Using a newly Developed Membrane Covered Ceramic Foam Filtering Media, Helferich and Schenck, The Duriron Company, Inc.

The Economist Newspaper Ltd., *Gassing truckers*, Business, finance and science, Science and Technology, p. 97 (UK Edition).

*Regeneration performance of a Catalyzed Versus a Non-Catalyzed Ceramic Membrane Diesel particulate Trap*, Helferich (Corcona, Inc.), Yoshida and Ogasawara (Rikon Corp.) pp. 121–134.

Fuel, 1989, vol. 68, Jul., *Exhaust emission reduction from a heavy duty diesel truck, using a catalyst and a particulate trap*, Westerholm, Hang, Egeback and Gragg, pp. 856–860.

*Start Catalyst Systems Employing Heated Catalyst Technology for Control of Emissions from Methanol–Fueled Vehicles*, Hellman, Piotrowski, and Schaefer, U.S. Environmental Protection Agency, pp. 105–122.

*Diesel Particulate Control Around the World*, Walsh and Bradow, pp. 1–17.

Exhaust Gas Purifiers, Engelhard Exceptional Technologies, *Environmental Protection from the Pioneers in Applied Catalytic Technology*, 1991 various pages.

PTX Exhaust Gas Purifiers, Engelhard Exceptional Technologies, 1991 various pages.

Oberland Particle Filter, *Mode of Operation and Structure*, pp. 1–3.

Zeuna Starker's, Regeneration Systems: Filter Regeneration, various pages.

Primary Examiner—Joseph W. Drodge
Attorney, Agent, or Firm—Dinsmore & Shohl

[57] ABSTRACT

An improvement process for producing a coated porous ceramic, ceramic composite or metal structure, wherein the impregnation step is carried out by (a) fluidizing said slurry with steam or heated water and spraying said shape with said fluidized slurry or (b) heating said slurry so as to reduce its viscosity and spraying said shape with said reduced viscosity slurry. Manufacture of a single component which functions both as a filter and as a heating element, is made possible by the process of the present invention.

8 Claims, 1 Drawing Sheet

FILTER/HEATING BODY PRODUCED BY A METHOD OF SPRAYING A SHAPE

This application is a continuation-in-part application of application Ser. No. 08/353,727 filed Dec. 12, 1994.

FIELD OF THE INVENTION

This invention relates to a process for applying a conductive coating to a porous ceramic, ceramic composite or metal structure. This invention also relates to using this process for producing a device which acts as a heating element and as a filter in a regenerative filter application, particularly in exhaust emissions after treatment systems.

BACKGROUND OF THE INVENTION

During the last few years, several studies have evaluated the health risks associated with exposure to engine exhaust emissions. As a result of these studies, increasing government and health organizations have decided to tighten the standards which apply to engine-run vehicles, their fuels and their particulate and gaseous emissions.

On Nov. 15, 1990, the President of the United States signed into law the Clean Air Act Amendments of 1990. Beginning in 1994, the new law sets a performance criteria, particularly requiring buses operating more than 70 percent of the time in large urban areas (using any fuel) to cut particulates by 50 percent compared to conventional heavy duty vehicles. Also, beginning in 1994, the Environmental Protection Agency began requiring a yearly testing to determine whether buses subject to the standard are meeting the standard in use over their full useful life. Similar provisions exist in other countries and a global effort is underway to find exhaust filters and cleaning devices. In this regard, several countries in the first and third world have been actively cooperating to reduce emissions from exhaust systems. Essentially, this provision allows the use of exhaust after treatment devices to reduce particulate emissions to a very low level provided that they work in the field.

Because of the financial and logistical concerns with alternative fuels, transit authorities and bus engine manufacturers are seriously considering after treatment systems such as trap-oxidizer technology to meet 1993/94 EPA laws and regulations. Bus engines, for example, run on a stop-and-go cycle which forces the engines to operate with a dirty and sooty exhaust. Second, these vehicles operate in dense population areas and hence, bus exhaust and pollution is considered a greater health hazard than over-the-road trucks. Third, environmentalists would like to be as clean as possible even if it means going beyond EPA regulations. All of these factors make trap oxidizer technology very attractive, provided that its long-term durability can be proven and made available at reasonable costs.

The 1993/94 EPA law and regulations are only the first step in a series of ever-tightening regulations to follow. For the diesel engines industry, the next step in regulation occurs in 1998, when the laws require tighter $NO_x$ control. Even though $NO_x$ reduction for 1994 levels will be achieved by improved engine design, it is generally accepted that to meet the 1998 levels of 4 g/Bhp-h $NO_x$, diesel engines will have to use after treatment systems. As the $NO_x$ level is reduced, however, the particulate level increases. Hence, in trying to meet the 1998 low $NO_x$ levels, engine manufacturers are faced with increased particulates, which require further use of aftertreatment devices such as converters and traps.

The coated devices of the present invention provide improved regenerative systems which offer the flexibility, efficiency, and cost-effectiveness needed to meet the challenges presented by near-term (1994) and medium-term (1998) diesel emissions regulations.

The filters used in aftertreatment trap systems are the core of the system and great efforts are being made to fine-tune the existing systems to improve their effectiveness and durability. One of the problems of the current technology is in "regenerating" the filter by burning off the accumulated particulate matter. Initiating and controlling the regeneration process to ensure reliable regeneration without damage to the trap is the central engineering problem of trap oxidizer development today. The reason is that over time, the filter becomes loaded with the soot it has trapped and must be cleaned or "regenerated". The process of regeneration burns or "oxidizes" the soot collected within the filter. The cleaned filter can be used many times provided it can be successfully regenerated many thousands of times over its lifetime without failure. Many different regeneration concepts are being tested. They range from primitive off-board regeneration of the filter in an external oven to sophisticated on-board automatic electrical or burner regeneration systems using electronic controls and include catalytic injection systems. These approaches to regeneration can generally be divided into two groups: passive systems and active systems. Passive systems must attain the conditions required for regeneration during normal operation of the vehicle. Active systems, on the other hand, monitor the build up of particulate matter in the trap and trigger specific actions leading to regeneration when needed.

Passive regeneration systems face special problems on heavy duty vehicles. Exhaust temperatures from heavy duty diesel engines are normally low, and recent developments such as charge air cooling and increased turbo charger efficiency are reducing them still further. Under some conditions, it would be possible for a truck driver to drive for many hours without exceeding the exhaust temperature (around 400°–450° C.) required to trigger regeneration.

Active systems, on the other hand, are generally expensive, often requiring complex logic and electronics to initiate regeneration.

Engine and catalysts manufacturers have experimented with many catalytic converters and with a wide variety of regenerative catalytic traps, Precious metal catalytic traps are effective in oxidizing gaseous hydrocarbons and CO, but are relatively ineffective in promoting soot oxidation, a particular problem for diesel engines. Moreover, these metals also promote the oxidation of $SO_2$ to particulate sulfates such as sulfuric acid ($H_2SO_4$), Base metal catalytic traps, in contrast, are effective in promoting soot oxidation, but have little effect on hydrocarbons, CO, NO or $SO_2$. Another disadvantage of precious metal catalysts is that they are very expensive.

Unlike a catalytic trap, however, a flowthrough catalytic converter does not collect most of the solid particulate matter, which simply passes through in the exhaust. The particulate control efficiency of the catalytic converter is, of course, much less than that of a trap. One of the major disadvantages of the catalytic converter is the same as with the precious metal catalytic particulate trap: sulfate emissions. The main object of the catalysts used is to raise the exhaust temperature to a point that could convert the gaseous compounds to safer gaseous emissions. The catalysts undergo chemical reactions which raise the temperature of the exhaust gases allowing them to be converted to the safer gases. One of the major reasons which catalytic material and treatments are used to assist in trap regeneration, is that none of the heating systems attempted, such as diesel fuel burners, electrical heaters and other heaters have been successful. However, if there were a regeneration system in which a converter or trap could be used without a catalyst for regeneration, the above-listed objects would be achieved.

With respect to processes for the manufacture of porous ceramic articles, U.S. Pat. No. 3,090,094, issued May 21, 1963 to K. Schwartzwalder et al, discloses a method of making an open-cell porous ceramic article which comprises immersing an open-cell spongy material, preferably polyurethane, in a slurry containing a ceramic coating material to coat cell-defining walls of the spongy material, removing excess slurry from the spongy material, and firing the coated spongy material at a temperature and for a time sufficient to remove the spongy material and form a hardened, vitrified structure. The ceramic coating material may include particulate zirconia, zircon, petalite, mullite, talc, silica and alumina, having particle sizes ranging from −80 mesh to −600 mesh. A binder such as clay, sodium silicate, and calcium aluminate and phosphoric acid, is preferably present in the slurry. Firing is conducted at 500° to 3000 ° F. (260 ° to 1650 ° C.), preferably at 2100 ° to 2950 ° F. (1150° to 1620° C.).

U.S. Pat. No. 3,097,930, issued Jul. 16, 1963 to I. J. Holland, discloses a method of making a porous shape of sintered refractory material which comprises impregnating a foamed plastic sponge shape with a suspension of refractory particles, drying the impregnated shape, and firing the dried shape in an inert atmosphere to volatilize the sponge material and to sinter the refractory particles. The impregnation and drying steps may be repeated. The foamed plastic sponge may be polystyrene, polyethylene, polyvinyl chloride, latex, or polyurethane, the latter being preferred. Refractory materials include clays, minerals, oxides, borides, carbides, silicides, nitrides and mixtures thereof. Specific examples used alumina, beryllia and china clay with particle sizes ranging from less than 1 to greater than 10 microns. Firing was conducted at 1700 ° C. for alumina and 1350 ° C. for china clay.

U.S. Pat. No. 4,697,632, issued Oct. 6, 1987 to N. G. Lirones, discloses a ceramic foam filter, insulating refractory lining, and a melting crucible, and a process for production thereof, which comprises providing an open-cell foam pattern, impregnating the pattern with a ceramic slurry, burning out the foam pattern at a temperature between 1400 ° and 2200 ° F. (760 ° and 1205 ° C.) to form a ceramic substrate, impregnating the ceramic substrate with additional ceramic slurry, and firing the impregnated ceramic substrate at a temperature of 2200 ° to 3400 ° F. (1205 ° to 1870 ° C.). The foam pattern material may be a flexible polyurethane, polyethylene, polypropylene or graphite. A suitable ceramic slurry contains from 1% to 20% silica (dry weight), and from 99% to 80% alumina (dry weight), with a viscosity between 5 and 20 seconds and a film weight between 1.0 and 8.0 grams per standard six inch square plate. Preferably the slurry includes a suspending agent, a wetting agent and a defoaming agent. Zirconia may also be used as ceramic material.

U.S. Pat. No. 3,111,396, issued Nov. 19, 1963 to B. B. Ball, discloses a method of making a porous metallic article which comprises impregnating a porous organic structure with a suspension of powdered metal, metal alloy or metal compound, and binder, slowly drying the impregnated structure, heating at about 300°–500° F. (150°–260° C.) to char the organic structure, and then heating at about 1900° to about 3000° F. ( 1040° to 1650° C.) to sinter the powder into a porous material.

Other United States patents relating to porous ceramic filters and methods for making them include: 3,893,917—Jul. 8, 1975—M. J. Pryor et al; 3,947,363—Mar. 30, 1976—M. J. Pryor et al; 3,962,081—Jun. 8, 1976—J. C. Yarwood et al; 4,024,056—May 17, 1977—J. C. Yarwood et al; 4,081,371—Mar. 28, 1978—J. C. Yarwood et al; 4,257,810—Mar. 24, 1981—T. Narumiya; 4,258,099—Mar. 24, 1981—T. Narumiya; and 4,391,918—Jul. 5, 1983—J. W. Brockmeyer.

None of the above patents disclose or suggest the desirability of using conductive filters, which can also be used as heating elements. Additionally, there is no suggestion in any of the above patents to impregnate a substrate with a ceramic or ceramic composite slurry in the manner undertaken by the present invention. The problems associated with the prior art methods are similar to the problems associated with the method described in U.S. Pat. No. 5,279,737, which problems are described in greater detail below.

U.S. Pat. No. 5,279,737 ("the '737 patent") discloses a process for producing a porous ceramic, ceramic composite or metal-ceramic structure by micropyretic synthesis wherein a form polymer shape is impregnated with a slurry of ceramic precursors and ignited to initiate micropyretic synthesis, thereby attaining a ceramic, ceramic composite or metal-ceramic composite article having interconnected porosity. The '737 patent is incorporated by reference into the present application, in its entirety. "Micropyretics" or "micropyretically synthesized," as used herein refers to self propagating high temperature synthesis as discussed in the review article by Subrahmanyam et al., in The Journal of Micromolecular Science at Vol. 27, p.p. 6249–6273.

As will now be described, the present process also constitutes a novel and unobvious improvement over the process described in the '737 patent. The impregnation step in the '737 patent is achieved by dipping the polymeric foam in the slurry with which it is to be impregnated. This step is very cumbersome and awkward. Also during processing using the invention of the '737 patent, one has be extremely careful so that the "green structure" (the structure before sintering, micropyretic or otherwise), does not "collapse." Collapse as used herein refers to dissolution of the ceramic in structure, before sintering, before or after burning of the polymeric foam). The process of the '737 patent may also give rise to "distortion." Distortion as used herein means physical distortion which results from large structure sagging under its own weight prior to burning of the polymeric foam. The impregnation of the present process is achieved by (a) fluidizing said slurry with steam and spraying the shape with said fluidized slurry or (b) heating said slurry so as to reduce its viscosity and spraying the shape with said reduced viscosity slurry. This method of impregnation eliminates the above listed problems. Additionally, the steam or hot liquid constituent of the spray better dissolves certain constituents, such as calcium carbonates and silicates (cements) such as $(CaO)_3.(SiO_2)_2.(H_2O)_3$, which lead to a high green and final strength by precipitating out on the deposited surface as a cement. The present process also results in more uniform thickness of the ceramic.

The patent application of which this application is a continuation-in-part application, U.S. Ser. No. 08/353,727 filed Dec. 12, 1994, ("the '727 application") discloses a modulated filter for gaseous, liquid and particulate matter wherein the modules in said filter are porous ceramic or ceramic composite structures, said structures having interconnected porosity and having been manufactured using micropyretic synthesis, the filter comprising at least two porous ceramic or ceramic composite modules. Preferably each said module is optimized for extracting different materials. The '727 application also discloses a regenerator filter comprising a means for filtering and a means for regenerating said means for filtering, said means for regenerating being integral with said filtering means. The second aspect of the '727 application is of greater relevance to the present case. The '727 application is hereby incorporated by reference herein, in its entirety.

The regenerative filters of the '727 application comprise a heating element and a porous filter. However, there is no suggestion or motivation to one skilled in the art to modify the porous filters of the '727 application to make them conductive. There is also no suggestion of the desirability of making filters conductive so that the filters can simultaneously act as heating elements, thereby removing the need for a heating element. Additionally, there is no suggestion of applying any type of coating to the ceramic filters. Furthermore, the '727 application is devoid of any suggestion of using non-polymeric starting materials. Furthermore, because the heating element and filter are one and the same, less heat is lost due to radiation and the heat is available precisely where required, i.e. in the filter (which is also the heating element). The present application, on the other hand, achieves all the above listed properties and is therefore novel and unobvious over the '727 application.

SUMMARY OF THE INVENTION

It is an object of the present invention to provide a process for producing a coated structure which obviates the dipping involved in the impregnation step in the '737 patent.

It is a further object of the invention to provide a process for producing a coated structure wherein the impregnation step is less awkward and cumbersome than the impregnation step in the '737 patent.

It is another object of the invention to provide a process for producing a coated structure which avoids the collapse of the "green structure" during processing, as observed in the '737 patent.

It is still another object to provide a process for producing a coated structure which avoids the distortion of the formed article during processing, as observed in the '737 patent.

It is a further object of the invention to provide a process for producing a coated structure which better dissolves certain constituents more easily, such as calcium silicates (cements) such as $(CaO)_3.(SiO_2)_2.(H_2O)_3$, which lead to a high green and final strength by precipitating out on the deposited surface.

Yet another object of the present invention is to provide a process for producing a single component coated structure for use as a regenerative filter, which structure serves both as a filter and a heating element.

It is also an object of the present invention is to provide a process for producing a coated structure for use in exhaust systems, said coating being conductive.

According to the invention there is provided in a process for producing a porous ceramic or ceramic composite structure, comprising the steps of providing a slurry comprising ceramic precursors, impregnating a foamed polymer shape with said slurry, heating the slurry-impregnated polymer shape to a temperature sufficient to remove said polymer, and heating said ceramic precursors to obtain a ceramic or ceramic composite structure, an improvement process for producing a coated porous ceramic, ceramic composite or metal structure, the improvement process comprising the steps of: providing a slurry comprising (A) at least one component selected from the group consisting of (a) at least two particulate ceramic precursors capable of undergoing combustion synthesis, (b) at least one non-micropyretic particulate ceramic, (c) at least one metal, (d) at least one inter-metallic, (e) at least one polymeric material, and mixtures thereof; and (B) hydroplastic materials selected from the group consisting of clays, colloidal silica, colloidal alumina, colloidal zirconia, colloidal ceria and mixtures thereof; impregnating a ceramic, ceramic composite or metal shape with said slurry by (a) fluidizing said slurry with steam or heated water and spraying said shape with said fluidized slurry or (b) heating said slurry so as to reduce its viscosity and spraying said shape with said reduced viscosity slurry; and obtaining a coated porous ceramic, ceramic composite or metal structure by igniting said ceramic precursors to initiate combustion synthesis and/or by heating said non-micropyretic particulate ceramic, metal, inter-metallic or polymeric material so as to cause said non-micropyretic particulate ceramic, metal, inter-metallic or polymeric material to adhere to said porous ceramic, ceramic composite or metal structure.

According to the invention there is further provided n a process for producing a porous ceramic or ceramic composite structure, comprising the steps of providing a slurry comprising ceramic precursors capable of undergoing combustion synthesis, impregnating a foamed polymer shape with said slurry, heating the slurry-impregnated polymer shape to a temperature sufficient to remove said polymer, and igniting said ceramic precursors to initiate combustion synthesis, thereby obtaining a ceramic or ceramic composite structure having interconnected porosity and controlled pore size, an improvement process for producing a porous ceramic or ceramic composite, the improvement process comprising the steps of: providing an improved slurry comprising (A) at least one component selected from the group consisting of (a) at least two particulate ceramic precursors capable of undergoing combustion synthesis, (b) at least one non-micropyretic particulate ceramic, (c) at least one metal, (d) at least one inter-metallic, (e) at least one polymeric material, and mixtures thereof; and (B) hydroplastic materials selected from the group consisting of clays, colloidal silica, colloidal alumina, colloidal zirconia, colloidal ceria and mixtures thereof; impregnating said polymeric shape with said improved slurry by (a) fluidizing said improved slurry with steam or heated water and spraying said shape with said fluidized slurry or (b) heating said improved slurry so as to reduce its viscosity and spraying said shape with said reduced viscosity slurry; heating the improved-slurry-impregnated polymer shape to a temperature sufficient to remove said polymer; and obtaining a porous ceramic, ceramic composite or metal structure by igniting said ceramic precursors to initiate combustion synthesis and/or by heating said non-micropyretic particulate ceramic, metal, inter-metallic or polymeric material.

In accordance with a further aspect of the present invention there is provided a heating element in close contact with a porous body which is itself conductive or to which is applied a conductive coating, which porous body can itself function as a heating element, so as to cause it to heat up if a current is applied through said body and which can also function as a filter due to its porosity, wherein the heating element function and the filter function of the porous body is accomplished by a single undivided structure.

Another aspect of the present invention provides, in a regenerative filter comprising a means for filtering; and a means for regenerating said means for filtering, said means for regenerating being integral with said filtering means, the improvement comprising a pressure release safety valve for removing collected particulate matter, the valve being self-resetting or otherwise.

Yet another aspect of the present invention provides a non-regenerative filter means in combination with a pressure release safety valve for removing collected particulate matter, the valve being self-resetting or otherwise.

A further aspect of the present invention provides in a modulated filter for gaseous, liquid and particulate matter, wherein the modules in said filter are porous ceramic or ceramic composite structures, said structures having interconnected porosity and having been manufactured using micropyretic synthesis, the filter comprising at least two porous ceramic or ceramic composite modules, the improvement including flexible flaps in between or after the modules, said flaps being made of materials selected from the group consisting of fiber cloth, high temperature wools, and flexible boards, said flaps being susceptible to adherence by particulate fines.

Another aspect of the present invention provides in a regenerative filter comprising a means for filtering; and a means for regenerating said means for filtering, said means for regenerating being integral with said filtering means, the improvement comprising fins, metallic fins, or other conductive fins inside the regenerative filter, said fins being used to better distribute heat within the regenerative filter.

An additional aspect of the present invention provides in a modulated filter for gaseous, liquid and particulate matter, wherein the modules in said filter are porous ceramic or ceramic composite structures, said structures having interconnected porosity and having been manufactured using micropyretic synthesis, the filter comprising at least two porous ceramic or ceramic composite modules, the improvement comprising fins, metallic fins, or other conductive fins inside the regenerative filter, said fins being used to better distribute heat within the regenerative filter.

DETAILED DESCRIPTION OF THE INVENTION

Figure 1:
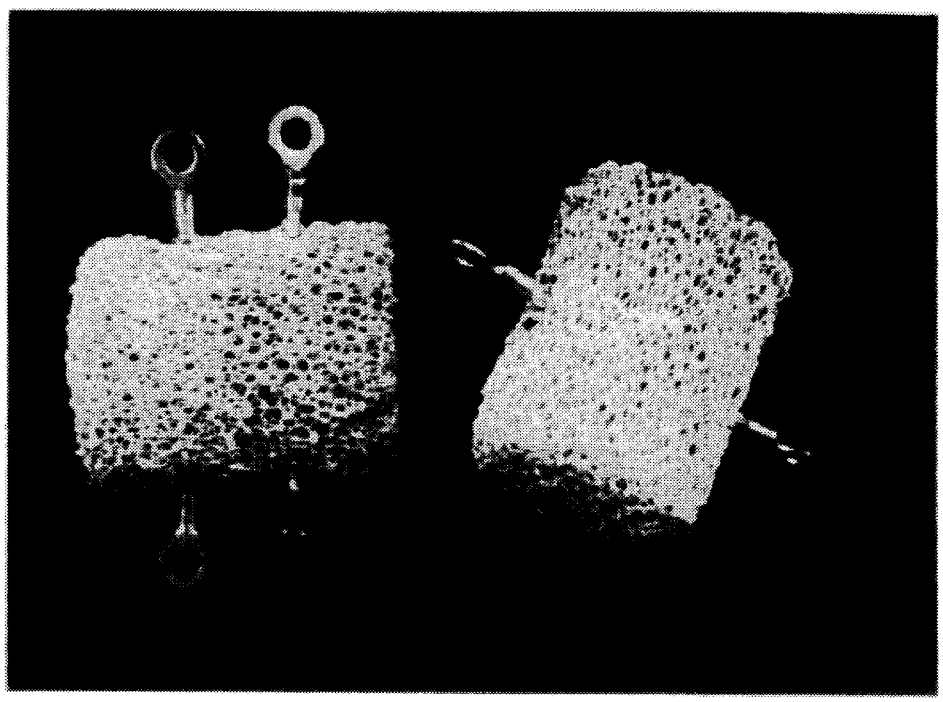
FIG. 1 shows two filters, with one and two heating elements formed in-situ, in accordance with the '727 application.

The preferred embodiments of the present invention will now be described in greater detail.

In the preferred practice of the process of the invention a slurry comprising (A) at least one component selected from the group consisting of (a) at least two particulate ceramic precursors capable of undergoing combustion synthesis, (b) at least one non-micropyretic particulate ceramic, (c) at least one metal, (d) at least one inter-metallic, (e) at least one polymeric material, and mixtures thereof; and (B) hydroplastic materials selected from the group consisting of clays, colloidal silica, colloidal alumina, colloidal zirconia, colloidal ceria and mixtures thereof, is provided. The slurry may contain conventional amounts of suspension agents, surfactants and anti-foaming agents, e.g., in total up to about 5% by volume, in order to facilitate application, wetting and impregnation of the substrate.

The concentration of ceramic precursors in the aqueous slurry is not critical and may be any amount which will obtain a viscosity such that wetting of the foamed polymer is ensured without excessive run-off. The type of foamed polymer (if used), is not critical, although it is preferred to select a thermoplastic or thermosetting polymer which will volatilize or decompose at a temperature not exceeding about 1100° C. In general, conventional foamed polymers which will volatilize, decompose or char when heated to a temperature of about 400° to about 1100° C. are suitable, such as polyurethane, polyvinyl chloride, polyethylene and polypropylene. Cellulose sponge and natural or polymeric fibers in woven or non-woven form may also be used and are intended to be included within the generic term foamed polymer.

The method of application of the slurry to the foamed polymer, i.e., impregnation, is what leads to the dramatic improvements afforded by the present invention over the process of the '737 patent. The impregnation of the present process is achieved by (a) fluidizing said slurry with steam or heated water and spraying the shape with said fluidized slurry or (b) heating said slurry so as to reduce its viscosity and spraying the shape with said reduced viscosity slurry.

The impregnation step of the present invention obviates the dripping involved in the '737 process, thereby making the process less awkward and cumbersome. This also avoids the collapse of the "green structure" during processing, as observed in the '737 patent. Furthermore, the present method of impregnation avoids "distortion" of the formed article. Additionally, the steam or heated water or hot liquid constituent of the spray better dissolves certain constituents more easily, such as calcium silicates (cements) such as $(CaO)_3.(SiO_2)_2.(H_2O)_3$, which lead to a high green and final strength by precipitating out on the deposited surface.

The slurry-impregnated polymer is heated to a temperature of about 400° to about 1100° C., in order to drive off the polymer. The slurry-impregnated polymer may next again be dipped into the slurry after the heating step and dried. The dipping and drying may be done several times. If it is desired to obtain a coated porous ceramic, ceramic composite or metal structure, a preexisting ceramic, ceramic composite or metal body is impregnated with the slurry as described above.

Finally, the impregnated structure is ignited and/or heated by means of an electric arc, electric spark, flame, welding electrode, laser or in a furnace or by other conventional methods to initiate combustion synthesis and/or to sinter the impregnated structure. The final product is a conductive porous ceramic structure or a coated (the coating being conductive), porous ceramic, ceramic composite or metal structure. Thus, the products of the present invention may act both as filters and, due to their conductiveness, as heating elements. As stated above, because the heating element and filter are one and the same, less heat is lost due to radiation and the heat is available precisely where required, i.e. in the filter (which is also the heating element). It is also possible to incorporate in the conductive body, a "second" heating element which is a separate structure, which further improves the capability of the heating the filter. The "two-in-one" heating element-filter may also be fitted with a pressure release safety valve for removing collected particulate matter, the valve being self-resetting or otherwise.

The ceramic precursors may comprise powder mixtures containing from about 35% to about 55% metallic aluminum, about 25% to about 35% titanium dioxide (titania), and about 20% to about 30% boric oxide, all percentages being by weight.

Another mixture of ceramic precursors in particulate form may comprise from about 65% to about 75% silicon and from about 5% to about 35% graphite, the percentages being by weight.

In another embodiment the ceramic precursors may comprise mixtures containing from about 20% to about 30% metallic aluminum, about 20% to about 25% titania, about 15% to about 25% boric oxide, about 25% to about 30% zirconium oxide, all percentages being by weight.

The ceramic precursors may further comprise from about 20% to about 30% metallic aluminum, about 20% to about 25% titania, about 15% to about 25% boric oxide, and about 25% to about 35% powdered niobium, all percentages being by weight.

Still another precursor mixture may comprise from about 20% to about 30% metallic aluminum, about 20% to about 25% titania, about 15% to about 25% boric oxide, about 20% to about 25% aluminum oxide, and about 3% to about 10% zirconium oxide, all percentages being by weight.

Where a micropyretic reaction is involved, the particle size of the ceramic precursors is of importance in determining the rate of reaction propagation. For purposes of the present process, particle sizes ranging from about 1 to about 150 microns have been found to be preferable.

It will be understood that the present process is not limited to any particular size or shape of ceramic structure or ceramic composite structure, nor to the pore size thereof, as will be evident from the specific examples which follow. The atmosphere in which combustion synthesis is conducted is also not a limitation. In all embodiments described herein, combustion synthesis may be carried out in air at ambient pressure.

The ceramic or ceramic composite structure/coating is selected from the group consisting of borides of titanium, zirconium, niobium, tantalum, molybdenum, hafnium, chromium, and vanadium; carbides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum-aluminum compounds, phosphides of nickel, titanium-nickel, oxides and oxychlorides of ruthenium, mullite, cordierite and mixtures thereof.

In the following illustrative but non-limiting embodiments of the invention, Examples 1 through 3 relate to the preparation of coatings having micropyretic constituents, while Examples 4 and 5 relate to coatings having non-micropyretic constituents, Aqueous slurries were prepared for the following mixtures. All constituents were powders and all percentages are in weight percent,

EXAMPLE 1

55% Ni+23% Al+3% C+10% $SiO_2$+2% Pt (catalyst powder form)+2% $CACO_3$+5% clay (the clay is selected from the montmorillonite group of clays, a group containing bentonite, sauconite, nontronite, saponite, hectonite and vermaculate, called three-layered clays)+water (10 ml/50 g powder)

EXAMPLE 2

57% $MoO_3$+21% Al+22% Si+(diluents)+(catalysts such as Pt) (eg $MoSi_2$ or SiC)+ colloidal silica(1 ml/5g)+water (20 ml/50 g powder)

EXAMPLE 3

60% Ti+15% Si+5% P+10% Ni+5% (SIC fibers)+3% $PTO_2$ (powder)+2% $RuCl_2$ (liquid)+colloidal silica+colloidal alumina+colloidal zirconia (approx 10 ml/50 g)

EXAMPLE 4

30% $Al_2O_3$+25% $SiO_2$+29% $ZrO_2$+10% ($Al_2O_3$ fibers)+ 2%$RuCl_2$ (ruthenium chloride)+3% $PtO_2$ (catalyst)+colloidal silica (10 ml/15 g)+0.5% $TIO_2$+0.5% MgO In some cases $RuCl_2$ was added later and heated to 430° C.

EXAMPLE 5

50% constituents of example 3 and 50% constituents of Example 4

General Procedure

The slurries were fluidized and were well mixed in stainless steel containers. A spray machine/steam generator/portable oil fired steam cleaner (model 5Z170 made by Dayton Company) is used to generate a spray of hot liquid or steam or water. It is a 66 gallon per hour machine which operates at up to 180 psi. Generally, the hot liquid or steam or water is sprayed on the slurry with a nozzle at a pressure of 10 ppi. A polymeric foam cylinder approximately 3" diameter and 4" height was used. Uniform coating of the foam stems was obtained and the pressure of the jet helped to keep the pores open. After each spray a 5 minute drying time was allowed before the next layer was deposited. The layers were allowed to build up until a 0.35 mm stem thickness was obtained. The non-distorted mass was then heated to 350° C. to drive away the polymer and a green ceramic or ceramic composite structure was obtained. The mass was then placed in a furnace. Furnace temperature for examples 1–3 was 1150° C., for examples 4 and 5, it was 1600° C. In all cases, either through micropyretic sintering, or conventional sintering a solid ceramic porous body was obtained. Examples 1 through 3 produced conductive coatings whereas 4 and 5 were not conductive.

While specific examples of coating porous ceramic, ceramic composite or metal structures have not been provided, the slurries described above are equally applicable for producing coated articles and the advantages afforded by the impregnation method of the present invention extend to manufacture of coated articles as well.

Figure 2:
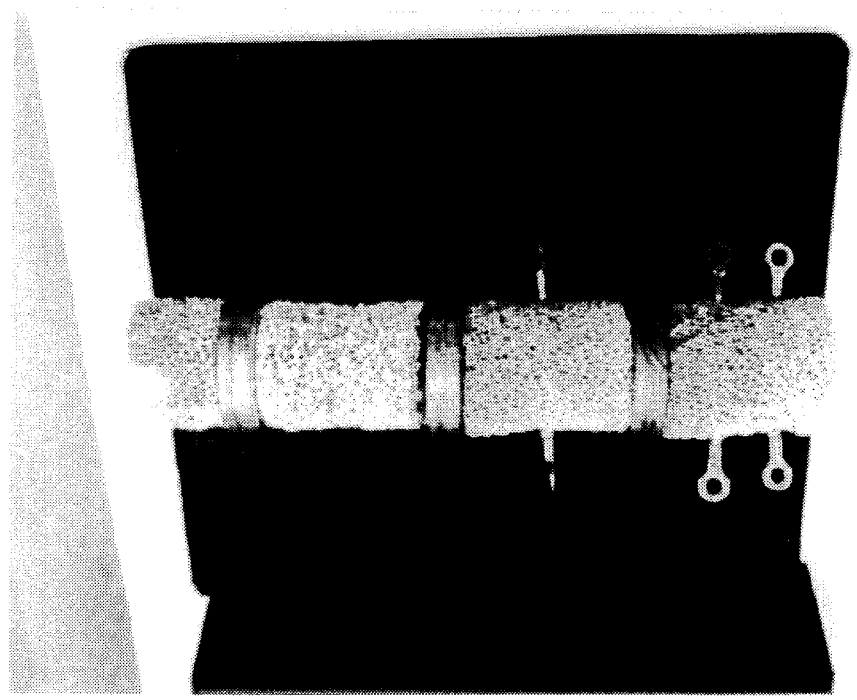
FIG. 2 shows a modulated filter comprising four modules, two with no heating elements, one with one heating element and one with two, also in accordance with the '727 application.

The remaining aspects of the present invention, as described above in the "Summary of the Invention" section, are improvements over the regenerative filter means and/or modulated filters as described in detail in the '727 application. FIGS. 1 and 2 are provided for a better understanding of these aspects.

In a regenerative filter as shown in FIGS. 1 and 2, comprising a means for filtering; and a means for regenerating said means for filtering, said means for regenerating being integral with said filtering means, the first improvement of the present invention comprises a pressure release safety valve for removing collected particulate matter, the valve being self-resetting or otherwise.

Preferably, the means for filtering comprises at least one porous ceramic or ceramic composite structure having interconnected porosity and having been manufactured using micropyretic synthesis. Preferably, the means for regenerating is a heating element. Optionally, the regenerating means may also be a catalyst.

The heating element comprises a compound selected from the group consisting of metallic material, molybdenum silicides, Fe—Cr—Al, Ni—Cr, SiC and combinations thereof.

Preferably, the regenerating means (the heating element or catalyst) is formed in situ with the ceramic or ceramic composite filter.

Preferably, the ceramic or ceramic composite is reticulated, The catalyst, if present, is applied to the filter by coating, impregnating, and combinations thereof. Of the several materials disclosed in the '737 patent, it is preferred that the ceramic or ceramic composite comprise a material selected from the group consisting of borides of titanium, zirconium, niobium, tantalum, molybdenum, hafnium, chromium, and vanadium; carbides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium borideotitanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum-aluminum compounds, phosphides of nickel, titanium-nickel, oxides and oxychlorides of ruthenium, mullite, cordierite and mixtures thereof.

Yet another aspect of the present invention provides a non-regenerative filter means in combination with a pressure release safety valve for removing collected particulate matter, the valve being self-resetting or otherwise.

The above two aspects may be further enhanced by including a means for heating the fluid entering the valve.

A further aspect of the present invention provides in a modulated filter (as shown in FIG. 2), for gaseous, liquid and particulate matter, wherein the modules in said filter are porous ceramic or ceramic composite structures, said structures having interconnected porosity and having been manufactured using micropyretic synthesis, the filter comprising at least two porous ceramic or ceramic composite modules, an improvement including flexible flaps in between or after the modules, said flaps being made of materials selected from the group consisting of fiber cloth, high temperature wools, and flexible boards, said flaps being susceptible to adherence by particulate fines.

The flaps of the above improvement may preferably be flexible enough so that they are displaced if the flow rate of the fluid to be filtered increases beyond a specified value, but which flaps remove fine particulates at lower flow rates.

Preferably, the porous ceramic or ceramic composite is reticulated. "Reticulated" as used herein refers to a porous 3-dimensional structure without straight-through channels.

As stated above, the greater the roughness of a filter material, the better the performance of the filter. Therefore, it is preferred that the porous ceramic or ceramic composite has a rough surface. A "rough" surface as used herein may be understood as a surface with a high frequency of peaks and valleys, the peaks and valleys creating spaces suited for particle trapping. The roughness of the ceramic or ceramic composite can be enhanced either chemically or mechanically.

Of the several materials disclosed in the '737 patent, it is preferred that the ceramic or ceramic composite comprise a material selected from the group consisting of borides of titanium, zirconium, niobium, tantalum, molybdenum, hafnium, chromium, and vanadium; carbides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum-aluminum compounds, phosphides of nickel, titanium-nickel, oxides and oxychlorides of ruthenium, mullite, cordierite and mixtures thereof.

Another aspect of the present invention provides, in a regenerative filter comprising a means for filtering; and a means for regenerating said means for filtering, said means for regenerating being integral with said filtering means, an improvement comprising fins, metallic fins, or other conductive fins inside the regenerative filter, the fins being used to better distribute heat within the regenerative filter.

An additional aspect of the present invention provides in a modulated filter for gaseous, liquid and particulate matter, wherein the modules in said filter are porous ceramic or ceramic composite structures, said structures having interconnected porosity and having been manufactured using micropyretic synthesis, the filter comprising at least two porous ceramic or ceramic composite modules, the improvement comprising fins, metallic fins, or other conductive fins inside the regenerative filter, said fins being used to better distribute heat within the regenerative filter.

Thus, it is apparent that there have been provided, in accordance with the present invention, devices in accordance with the present invention. These devices fully satisfy the aspects and objects of the present invention as set forth above. While the invention has been described in conjunction with specific embodiments thereof, it is evident that many alternatives, modifications and variations will be apparent to those skilled in the art in light of the foregoing description and examples. Accordingly, it is intended to embrace all such alternatives, modifications and variations which fall within the spirit and broad scope of the appended claims.

I claim:

1. A single undivided porous body, which porous body can function as a heating element by heating up if a current is applied through said body, and which can also function as a filter due to its porosity, wherein said body is itself conductive, said body being manufactured by a process comprising the steps of:

providing an improved slurry comprising (A) at least one component selected from the group consisting of (a) at least two particulate ceramic precursors capable of undergoing combustion synthesis, (b) at least one non-micropyretic particulate ceramic material, (c) at least one metallic material, (d) at least one inter-metallic material, (e) at least one polymeric material, and mixtures thereof; and (B) hydroplastic materials selected from the group consisting of clays, colloidal silica, colloidal alumina, colloidal zirconia, colloidal ceria and mixtures thereof;

impregnating a polymeric shape with said improved slurry by (a) fluidizing said improved slurry with steam or heated water and spraying said shape with said fluidized slurry or (b) heating said improved slurry so as to reduce its viscosity and spraying said shape with said reduced viscosity slurry;

heating the improved-slurry-impregnated polymeric shape to a temperature sufficient to remove polymer from within said shape; and obtaining a porous ceramic, ceramic composite, metallic or polymer structure by igniting, if present, said ceramic precursors to initiate combustion synthesis and/or by heating said non-micropyretic particulate ceramic; metallic, inter-metallic or polymeric material so as to cause said non-micropyretic particulate ceramic, metallic, inter-metallic or polymeric material to sinter.

2. A combination heating element-porous body as in claim 1, which comprises a second heating element, different in its composition from the single porous body.

3. A single porous body as in claim 1, in combination with a pressure release safety valve for removing collected particulate matter, the valve being self-resetting or otherwise.

4. The porous body heating element of claim 1, wherein said porous ceramic or ceramic composite structure comprises a material selected from the group consisting of borides of titanium, zirconium, niobium, tantalum, molybdenum, hafnium, chromium, and vanadium; carbides of titanium, hafnium, boron, aluminum, tantalum, silicon, tungsten, zirconium, niobium, and chromium; carbonitrides of titanium, niobium, and tantalum; nitrides of titanium, zirconium, boron, aluminum silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum-aluminum compounds, phosphides of nickel, titanium-nickel, oxides and oxychlorides of ruthenium, mullite, cordierite and mixtures thereof.

5. A single undivided porous body, which porous body can function as a heating element by heating up if a current is applied through said body, and which can also function as a filter due to its porosity, wherein a conductive coating is applied to said body, said body being a ceramic, ceramic composite or metal structure, the coating being applied by a process comprising the steps of:

providing a slurry comprising (A) at least one component selected from the group consisting of (a) at least two particulate ceramic precursors capable of undergoing combustion synthesis, (b) at least one non-micropyretic particulate ceramic material, (c) at least one metallic material, (d) at least one inter-metallic material, (e) at least one polymeric material, and mixtures thereof; and (B) hydroplastic materials selected from the group consisting of clays, colloidal silica, colloidal alumina, colloidal zirconia, colloidal ceria and mixtures thereof;

impregnating a ceramic, ceramic composite or metallic shape with said slurry by (a) fluidizing said slurry with steam or heated:water and spraying said shape with said fluidized slurry or (b) heating said slurry so as to reduce its viscosity and spraying said shape with said reduced viscosity slurry; and obtaining a coated porous ceramic, ceramic composite or metallic structure by igniting, if present, said ceramic precursors to initiate combustion synthesis and/or by heating said non-micropyretic particulate ceramic, metallic, inter-metallic or polymeric material so as to cause said non-micropyretic particulate ceramic, metallic, inter-metallic or polymeric material to adhere to said porous ceramic, ceramic composite or metal structure.

6. A heating element in close contact with a porous body, which porous body can itself function as a heating element, by heating up if a current is applied through said body and which can also function as a filter due to its porosity, wherein the heating element function and the filter function of the porous body is accomplished by a single undivided structure, wherein said body itself is conductive, said body being manufactured by a process comprising the steps of:

providing an improved slurry comprising (A) at least one component selected from the group consisting of (a) at least two particulate ceramic precursors capable of undergoing combustion synthesis, (b) at least one non-micropyetic particulate ceramic material, (c) at least one metallic material, (d) at least one inter-metallic material, (e) at least one polymeric material, and mixtures thereof; and (B) hydroplastic materials selected from the group consisting of clays, colloidal silica, colloidal alumina, colloidal zirconia, colloidal ceria and mixtures thereof;

impregnating a polymeric shape with said improved slurry by (a) fluidizing said improved slurry with steam or :heated water and spraying said shape with said fluidized slurry or (b) heating said improved slurry so as to reduce its viscosity and spraying said shape with said reduced viscosity slurry;

heating the improved-slurry-impregnated polymeric shape to a temperature sufficient to remove polymer from within said shape; and obtaining a porous ceramic, ceramic composite, metallic or polymer structure by igniting, if present, said ceramic precursors to initiate combustion synthesis and/or by heating said non-micropyretic particulate ceramic, metallic, inter-metallic or polymeric material so as to cause said non-micropyretic particulate ceramic, metallic, inter-metallic or polymeric material to sinter.

7. The heating element in close contact porous body of claim 6, wherein either said heating element, or said porous body or both said heating element and said porous body, are a ceramic or ceramic composite structure comprising a material selected from the group consisting of borides of titanium, zirconium, niobium, tantalum, molybdenum, hafnium, chromium, and vanadium; carbides of titanium, hafnium, boron, aluminum, tantalum, silicon, tungsten, zirconium, niobium, and chromium; carbonitrides of titanium, niobium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide, vanadium nitride-aluminum oxide, aluminides of nickel, platinum-aluminum compounds, phosphides of nickel, titanium-nickel, oxides and oxychlorides of ruthenium, mullite, cordierite and mixtures thereof.

8. A heating element in close contact with a porous body to which is applied conductive coating, which porous body can itself function as a heating element, by heating up if a current is applied through said body and which can also function as a filter due to its porosity, wherein the heating element function and the filter function of the porous body is accomplished by a single undivided structure, said body being a ceramic, ceramic composite or metal structure, the coating being applied to said body by a process comprising the steps of:

providing a slurry comprising (A) at least one component selected from the group consisting of (a) at least two particulate ceramic precursors capable of undergoing combustion synthesis, (b) at least one non-micropyretic particulate ceramic material, (c) at least one metallic material, (d) at least one inter-metallic material, (e) at least one polymeric material, and mixtures thereof; and (B) hydroplastic materials selected from the group consisting of clays, colloidal silica, colloidal alumina, colloidal zirconia, colloidal ceria and mixtures thereof;

impregnating a ceramic, ceramic composite or metallic shape with said slurry by (a) fluidizing said slurry with steam or heated water and spraying said shape with said fluidized slurry or (b) heating said slurry so as to reduce its viscosity and spraying said shape with said reduced viscosity slurry; and obtaining a coated porous ceramic, ceramic composite or metallic structure by igniting, if present, said ceramic precursors to initiate combustion synthesis and/or by heating said non-micropyretic particulate ceramic, metal, inter-metallic or polymeric material so as to cause said non-micropyretic particulate ceramic, metallic, inter-metallic or polymeric material to adhere to said porous ceramic, ceramic composite or metallic structure.

* * * * *

UNITED STATES PATENT AND TRADEMARK OFFICE
CERTIFICATE OF CORRECTION

PATENT NO. : 5,558,760
DATED : Sep. 24, 1996
INVENTOR(S) : Sekhar

It is certified that error appears in the above-indentified patent and that said Letters Patent is hereby corrected as shown below:

On the title page: Item

"[73]" Assignee section, please change "Cincinnatti," to --Cincinnati--.

In column 14, line 7, please change "heated:" to --heated--.

In claim 7, line 55, please change "contact porous" to --contact with a porous--.

Signed and Sealed this

Fourth Day of March, 1997

*Attest:*

BRUCE LEHMAN

*Attesting Officer*  *Commissioner of Patents and Trademarks*